July 14, 1942. J. L. KOUBEK 2,290,056
LOCK WASHER
Filed June 12, 1939
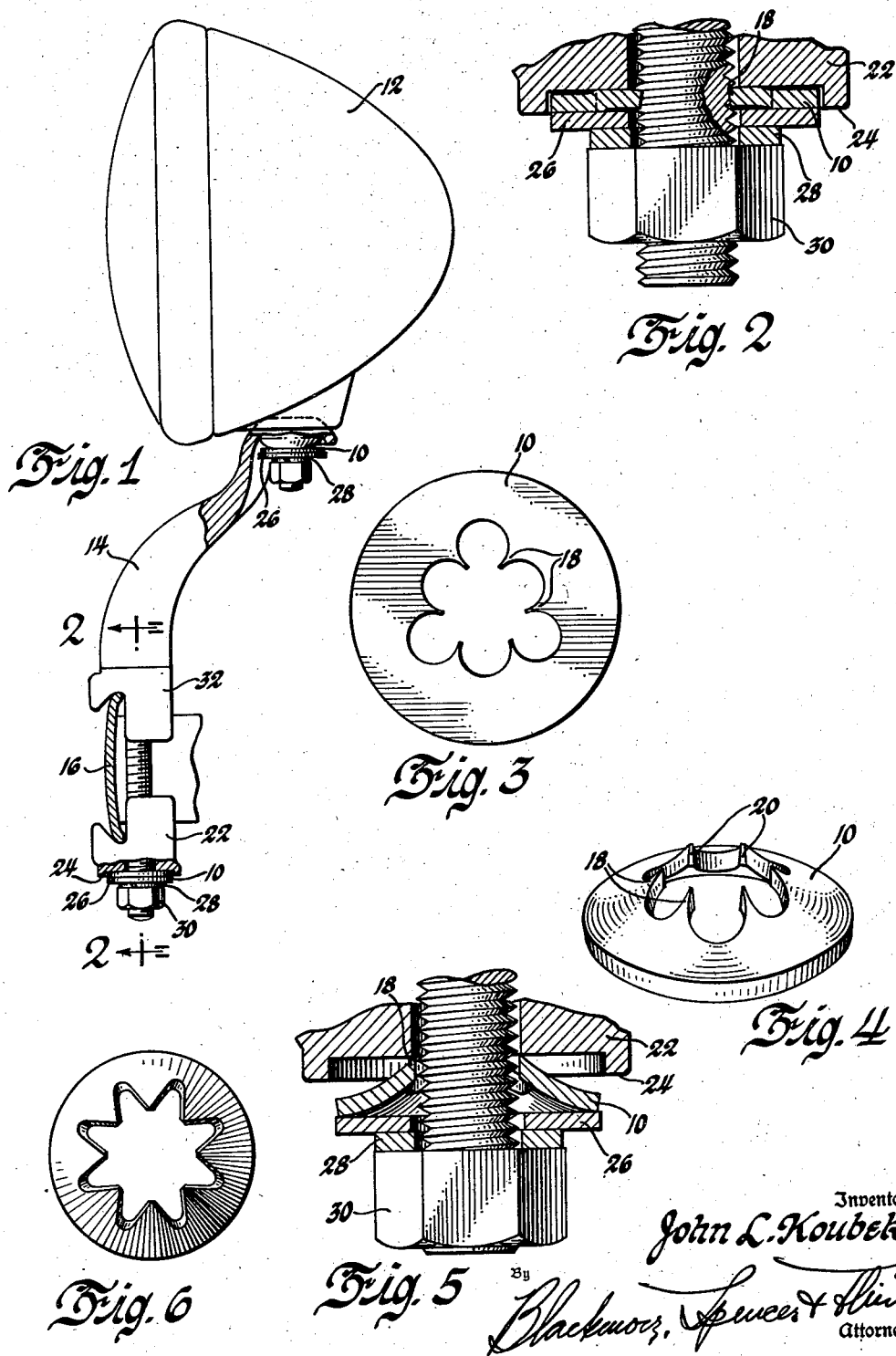

Patented July 14, 1942

2,290,056

UNITED STATES PATENT OFFICE 2,290,056

LOCK WASHER

John L. Koubek, Anderson, Ind., assignor to General Motors Corporation, Detroit, Mich., a corporation of Delaware Application June 12, 1939, Serial No. 278,670

1 Claim. (Cl. 151—14)

This invention has to do with a lock washer adapted to encircle the shank of a bolt and prevent its withdrawal much the same as the usual nut does except that my improved lock washer is provided with teeth which are forced into biting engagement with the shank of the bolt so that in order to remove the bolt it is necessary either to cut through the washer or to pry off the washer and in doing so force the washer teeth to cut channels extending to the end of the bolt. In order that the washer teeth may cut into the metal of the bolt rather than bend, it is necessary that the washer be of hardened metal. The teeth should, of course, be relatively sharp.

To further insure against removal of the bolt it will often prove advantageous to provide a countersink in the support or in a nut against which the washer abuts, the countersink housing the washer so that it is difficult, if not impossible, to pry the washer loose from the bolt.

In the drawing:

Figure 1 is a view partly in section showing the improved lock washer in use to secure a fog lamp to the usual bumper bar of an automobile.

Figure 2 is an enlarged view, partly in section, taken on line 2—2 of Figure 1.

Figure 3 is a view of the washer before it is formed.

Figure 4 is a perspective view of the washer.

Figure 5 is a view of the parts shown in Figure 2 prior to flattening the washer.

Figure 6 is a view showing a slightly modified form of washer.

In Figure 1 the improved washer 10 is shown as it is used in securing a fog lamp 12 to a bracket 14 and also in securing the bracket 14 to bumper bar 16 so as to prevent theft.

The washer, as shown in Figures 3 and 4, consists of an annular sheet metal stamping having its inner periphery scalloped to provide pointed tongues 18, these tongues preferably being sheared to provide substantially triangular surfaces 20 at their tips extending parallel to the axis of the washer so as to permit the washer to be readily slipped over the shank of the bolt.

In Figures 2 and 5, 22 indicates a part through which the shank of the bolt is passed. In the case illustrated this is a clamp which slides on the bolt shank and engages the lower edge of the bumper bar 16. 24 indicates a countersink provided in the part 22 to receive the washer 10. 26 indicates a plain washer surrounding the shank beneath the lock washer 10. 28 indicates the conventional spring lock washer, and 30 the securing nut. The parts 26, 28 and 30 are conventional. In the present instance the nut 30 not only serves to draw the parts together to cause the clamp 22 and cooperating clamp 32 to grip the bumper bar 16 but at the same time causes the washer 10 to be flattened out into the shape shown in Figure 2 with the teeth 18 embedded in the shank of the bolt. Once distorted to the shape shown in Figure 2 the washer 10 remains permanently in that shape and the only way to get it off and release the bolt is to either cut through the washer and expand it or else pry the washer off or drive the bolt through it and either of these last methods requires that the teeth 18 cut themselves channels extending lengthwise of the bolt to and through the free end thereof. This, of course, requires the use of considerable force and the resulting noise or the noise incident to cutting through the washer, bolt shank or other parts is such as to deter theives from attempting to remove the article secured by the bolt.

The washer may be made of any suitable metal, such as sheet steel and may be hardened by any known methods such, for example, as cyanide treatment.

In Figure 6 there is shown a slight modification in that the scallops at the inner edge of the washer are longer, providing teeth of greater width.

I claim:

In a theft proof locking means for securing bolts the combination of a support having an aperture therein, a countersink around the aperture, a threaded bolt extending through the aperture, a lock washer made of hardened sheet metal and formed into substantially the shape of a continuous unbroken frustum of a cone except that the inner edge of the washer is interrupted to form projecting teeth the ends of which are bounded by surfaces extending parallel to the axis of the washer, the aperture defined by said surfaces being of slightly greater diameter than the said bolt to permit the washer to be readily slipped over the bolt with its inner periphery seated in said countersink, said washer being sufficiently thin and deformable so that when clamped in place by tightening up a nut on the bolt it will be stressed beyond its elastic limit and will be flattened out between the nut and the support so as to lie wholly within the said countersink and the teeth will bite into and deform the shank of the bolt thereby preventing removal of the bolt except by stripping its threads or otherwise destroying the bolt or washer.

JOHN L. KOUBEK.